United States Patent [19]

Hirose

[11] Patent Number: 5,442,745
[45] Date of Patent: Aug. 15, 1995

[54] METAPHOR SELECTING/SWITCHING SYSTEM IN INFORMATION PROCESSORS

[75] Inventor: Makoto Hirose, Tokyo, Japan

[73] Assignee: Institute for Personalized Information Environment, Tokyo, Japan

[21] Appl. No.: 899,986

[22] Filed: Jun. 17, 1992

[30] Foreign Application Priority Data

Jun. 18, 1991 [JP] Japan ................. 3-146071

[51] Int. Cl.$^6$ ............................................. G06F 3/00
[52] U.S. Cl. .................................................... 395/155
[58] Field of Search ..................... 395/155–161, 395/12, 54, 154, 600, 60–62; 345/117–120

[56] References Cited

U.S. PATENT DOCUMENTS 5,202,828  4/1993  Vertelney ................. 395/159 X

OTHER PUBLICATIONS

Fujii et al., "Features and a Model for Icon Morphological Transformation", IEEE Workshop, Oct. 1991, pp. 240–245.
Myers, "Window Interfaces", IEEE Comp. Graphics & Applications Sep. 1988, pp. 65–84.
Clarisse et al, "An Icon Manager in Lisp", 1985 IEEE Workshop, Jun. 1985, pp. 116–131.
DeskSet Environment Reference Guide, Sun Microsystems, 1990, pp. 189–211.
CHI, '91, Conference Proceedings, Human Factors in Computing Systems, Reaching Through Technology, 27 Apr. 1991, H. Nonogaki et al. 'Friend 21 Project: A Construction of 21st Century Human Interface', pp. 407–414.
Patent Abstracts of Japan, vol. 15, No. 262 (P-1222) 3 Jul. 1991 & JP-A-30 84 622 (Personal Joho Kankyo Kyokai) 10 Apr. 1991.
Proceedings of the 23rd Annual Hawaii International Conference on System Sciences, vol. 3/4, 2 Jan. 1990, K. A. Griggs 'A Visual Agent Approach for Modeling Organizations', pp. 363–372.
European Search Report dated Jun. 16, 1993.

Primary Examiner—Mark R. Powell
Assistant Examiner—John E. Breene
Attorney, Agent, or Firm—Armstrong, Westerman, Hattori, McLeland & Naughton

[57] ABSTRACT

A metaphor selecting/switching system in an information processor which incorporates metaphor and function groups 3 and 2 independently, selects a matched metaphor/function combination based on similarities between metaphors and functions and lets input and output of information be performed via an input/output device comprises attribute lists 4 and 5 having information on attributes and similarities regarding each metaphor and each function, a similarity calculator device 6 for calculating similarities from the information on the similarity regarding each metaphor and each function, and a control device 7 for controlling the switching of one metaphor to another and the matching of a particular metaphor with a particular function, switching of one metaphor to another being performed by calculating similarities whenever operation is performed via input/output device.

Thus, the function or metaphor having the highest similarity is automatically selected as a well-matched metaphor/function combination. This makes it unnecessary for the user to memorize which metaphor corresponds to which function, and so releases the user from the troublesome work. In addition, the user can be presented with information with the metaphor most familiar to him, because the matching of metaphors with functions is achieved in terms of similarities therebetween. Even with an information processor having additional functions, the work load on the user can be reduced, because it can be used with metaphors familiar with him.

5 Claims, 12 Drawing Sheets

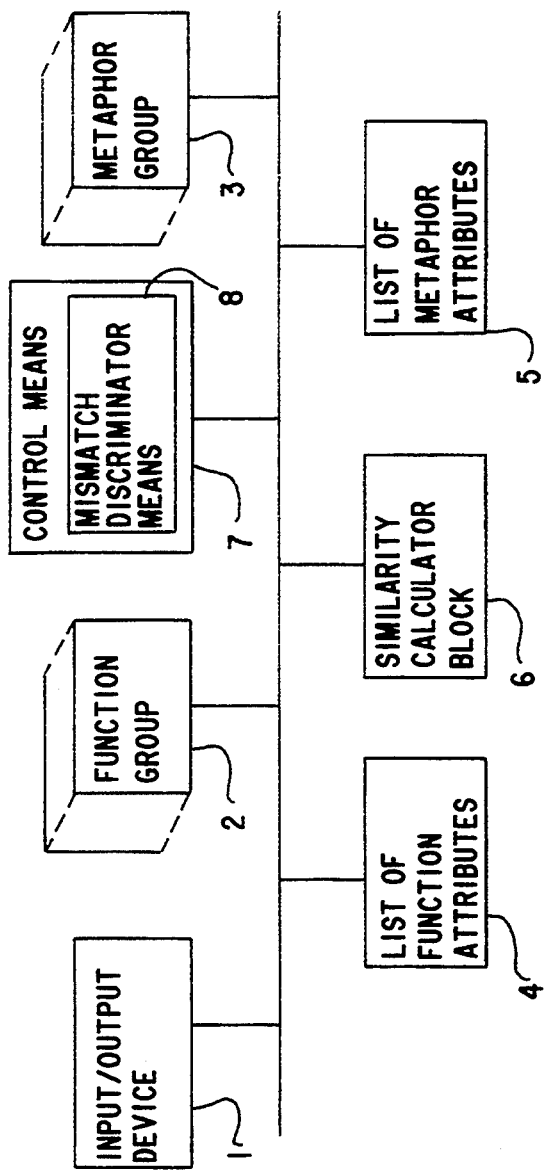

| ATTRIBUTES | FUNCTION 1 | FUNCTION 2 | FUNCTION 3 | ...... | FUNCTION N |
|---|---|---|---|---|---|
| ATTRIBUTE 1 | ATTRIBUTE SET | ATTRIBUTE SET | ATTRIBUTE SET | ...... | ATTRIBUTE SET |
| ATTRIBUTE 2 | ATTRIBUTE SET | ATTRIBUTE SET | ATTRIBUTE SET | ...... | ATTRIBUTE SET |
| ...... | | | | | |
| ATTRIBUTE M | ATTRIBUTE SET | ATTRIBUTE SET | ATTRIBUTE SET | ...... | ATTRIBUTE SET |

FIG.3(B)

| ATTRIBUTES | VTR | TELEPHONE | NEWSPAPER | TV | RADIO |
|---|---|---|---|---|---|
| TYPE OF INFORMATION PROCESSING | CREATION 0%<br>STORAGE 50%<br>RETRIEVAL 50%<br>COMMUNICATION 0% | CREATION 0%<br>STORAGE 0%<br>RETRIEVAL 0%<br>COMMUNICATION 100% | CREATION 0%<br>STORAGE 20%<br>RETRIEVAL 80%<br>COMMUNICATION 0% | CREATION 0%<br>STORAGE 0%<br>RETRIEVAL 0%<br>COMMUNICATION 100% | CREATION 0%<br>STORAGE 0%<br>RETRIEVAL 0%<br>COMMUNICATION 100% |
| KIND OF INFORMATION | VISUAL 50%<br>AUDITORY 50% | VISUAL 0%<br>AUDITORY 100% | VISUAL 100%<br>AUDITORY 0% | VISUAL 50%<br>AUDITORY 50% | VISUAL 0%<br>AUDITORY 100% |

| ATTRIBUTES | TEXT DATABASE REGISTRATION | TEXT DATABASE RETRIEVAL | MOTION PICTURE DATABASE REGISTRATION | MOTION PICTURE DATABASE RETRIEVAL |
|---|---|---|---|---|
| TYPE OF INFORMATION PROCESSING | CREATION 0%<br>STORAGE 100%<br>RETRIEVAL 0%<br>COMMUNICATION 0% | CREATION 0%<br>STORAGE 0%<br>RETRIEVAL 100%<br>COMMUNICATION 0% | CREATION 0%<br>STORAGE 100%<br>RETRIEVAL 0%<br>COMMUNICATION 0% | CREATION 0%<br>STORAGE 0%<br>RETRIEVAL 100%<br>COMMUNICATION 0% |
| KIND OF INFORMATION | VISUAL 50%<br>AUDITORY 50% | VISUAL 50%<br>AUDITORY 50% | VISUAL 50%<br>AUDITORY 50% | VISUAL 50%<br>AUDITORY 50% |

FIG.5(A)

| ATTRIBUTES | VTR | TELEPHONE | NEWSPAPER | TV | RADIO |
|---|---|---|---|---|---|
| TYPE OF INFORMATION PROCESSING | 0.50 | 0.00 | 0.80 | 1.00 | 1.00 |
| KIND OF INFORMATION | 1.00 | 0.50 | 0.50 | 1.00 | 0.50 |
| SIMILARITY | 1.50 | 0.50 | 1.30 | 2.00 | 1.50 |

FIG.5(B)

| ATTRIBUTES | VTR | TELEPHONE | NEWSPAPER | TV | RADIO |
|---|---|---|---|---|---|
| TYPE OF INFORMATION PROCESSING | 0.50 | 0.00 | 0.20 | 0.00 | 0.00 |
| KIND OF INFORMATION | 1.00 | 0.50 | 0.50 | 1.00 | 0.50 |
| SIMILARITY | 1.50 | 0.50 | 0.70 | 1.00 | 0.50 |

FIG.7(A)

| ATTRIBUTES | NEWS PROGRAM | | DICTIONARY | | ADDRESS DIRECTORY | |
|---|---|---|---|---|---|---|
| TYPE OF INFORMATION PROCESSING | CREATION<br>STORAGE<br>RETRIEVAL<br>COMMUNICATION | 0%<br>0%<br>90%<br>10% | CREATION<br>STORAGE<br>RETRIEVAL<br>COMMUNICATION | 0%<br>0%<br>100%<br>0% | CREATION<br>STORAGE<br>RETRIEVAL<br>COMMUNICATION | 0%<br>30%<br>70%<br>0% |
| NUMBER OF ITEMS OF INFORMATION | 2 ~ 9<br>10 ~ 199<br>200 ~ | 90%<br>10%<br>0% | 2 ~ 9<br>10 ~ 199<br>200 ~ | 10%<br>30%<br>60% | 2 ~ 9<br>10 ~ 199<br>200 ~ | 20%<br>80%<br>0% |
| INFORMATION SORT KEY | CATEGORY<br>KEYWORD<br>PERSON<br>DATE | 100%<br>0%<br>0%<br>0% | CATEGORY<br>KEYWORD<br>PERSON<br>DATE | 10%<br>70%<br>20%<br>0% | CATEGORY<br>KEYWORD<br>PERSON<br>DATE | 10%<br>0%<br>90%<br>0% |

FIG.7(B)

| ATTRIBUTES | TEXT DATABASE REGISTRATION | | TEXT DATABASE RETRIEVAL | |
|---|---|---|---|---|
| TYPE OF INFORMATION PROCESSING | CREATION<br>STORAGE<br>RETRIEVAL<br>COMMUNICATION | 0%<br>100%<br>0%<br>0% | CREATION<br>STORAGE<br>RETRIEVAL<br>COMMUNICATION | 0%<br>0%<br>100%<br>0% |
| NUMBER OF ITEMS OF INFORMATION | 2 ~ 9<br>10 ~ 199<br>200 ~ | DETERMINED ON EXECUTION<br>DETERMINED ON EXECUTION<br>DETERMINED ON EXECUTION | 2 ~ 9<br>10 ~ 199<br>200 ~ | DETERMINED ON EXECUTION<br>DETERMINED ON EXECUTION<br>DETERMINED ON EXECUTION |
| INFORMATION SORT KEY | CATEGORY<br>KEYWORD<br>PERSON<br>DATE | DETERMINED ON EXECUTION<br>DETERMINED ON EXECUTION<br>DETERMINED ON EXECUTION<br>DETERMINED ON EXECUTION | CATEGORY<br>KEYWORD<br>PERSON<br>DATE | DETERMINED ON EXECUTION<br>DETERMINED ON EXECUTION<br>DETERMINED ON EXECUTION<br>DETERMINED ON EXECUTION |

| ATTRIBUTES | NEWS PROGRAM | DICTIONARY | ADDRESS DIRECTORY | TEXT DATABASE RETRIEVAL |
|---|---|---|---|---|
| TYPE OF INFORMATION PROCESSING | CREATION 0%<br>STORAGE 0%<br>RETRIEVAL 90%<br>COMMUNICATION 10% | CREATION 0%<br>STORAGE 0%<br>RETRIEVAL 100%<br>COMMUNICATION 0% | CREATION 0%<br>STORAGE 30%<br>RETRIEVAL 70%<br>COMMUNICATION 0% | CREATION 0%<br>STORAGE 0%<br>RETRIEVAL 100%<br>COMMUNICATION 0% |
| NUMBER OF ITEMS OF INFORMATION | 2 ~ 9      90%<br>10 ~ 199  10%<br>200 ~       0% | 2 ~ 9      10%<br>10 ~ 199  30%<br>200 ~      60% | 2 ~ 9      20%<br>10 ~ 199  80%<br>200 ~       0% | 2 ~ 9     100%<br>10 ~ 199   0%<br>200 ~       0% |
| INFORMATION SORT KEY | CATEGORY 100%<br>KEYWORD    0%<br>PERSON       0%<br>DATE            0% | CATEGORY  10%<br>KEYWORD   70%<br>PERSON      20%<br>DATE            0% | CATEGORY  10%<br>KEYWORD    0%<br>PERSON      90%<br>DATE            0% | CATEGORY 33.3%<br>KEYWORD  33.3%<br>PERSON       0%<br>DATE         33.3% |
| SIMILARITY | 0.9 + 0.9 + 0.33<br>= 2.13 | 1 + 0.1 + 0.43<br>= 1.53 | 0.7 + 0.2 + 0.1<br>= 1.0 | |

FIG.9(A)

| ATTRIBUTES | NEWS PROGRAM | DICTIONARY | ADDRESS DIRECTORY | TEXT DATABASE RETRIEVAL |
|---|---|---|---|---|
| TYPE OF INFORMATION PROCESSING | CREATION 0%<br>STORAGE 0%<br>RETRIEVAL 90%<br>COMMUNICATION 10% | CREATION 0%<br>STORAGE 0%<br>RETRIEVAL 100%<br>COMMUNICATION 0% | CREATION 0%<br>STORAGE 30%<br>RETRIEVAL 70%<br>COMMUNICATION 0% | CREATION 0%<br>STORAGE 0%<br>RETRIEVAL 100%<br>COMMUNICATION 0% |
| NUMBER OF ITEMS OF INFORMATION | 2~9 90%<br>10~199 10%<br>200~ 0% | 2~9 10%<br>10~199 30%<br>200~ 60% | 2~9 20%<br>10~199 80%<br>200~ 0% | 2~9 0%<br>10~199 100%<br>200~ 0% |
| INFORMATION SORT KEY | CATEGORY 100%<br>KEYWORD 0%<br>PERSON 0%<br>DATE 0% | CATEGORY 10%<br>KEYWORD 70%<br>PERSON 20%<br>DATE 0% | CATEGORY 10%<br>KEYWORD 0%<br>PERSON 90%<br>DATE 0% | CATEGORY 33.3%<br>KEYWORD 33.3%<br>PERSON 0%<br>DATE 33.3% |
| SIMILARITY | 0.9 + 0.1 + 0.33<br>= 1.33 | 1 + 0.3 + 0.43<br>= 1.73 | 0.7 + 0.8 + 0.1<br>= 1.6 | |

FIG.9(B)

METAPHOR SELECTING/SWITCHING SYSTEM IN INFORMATION PROCESSORS

BACKGROUND OF THE INVENTION

The present invention relates to a metaphor selecting/switching system in an information processor, which incorporates metaphor and function groups independently and selects a pertinent metaphor/function combination based on similarities calculated between them, thereby allowing information to enter or leave said system through the selected metaphor via input-/output means.

Usually, an information processor incorporates a plurality of functions such as data base, word processor, graphics editor (for drawing) and communication functions.

For the information processor needed to present a user with information through a display device, on the other hand, it is desired that how to provide information and how to operate it be familiar to the user, and so various metaphors are proposed to achieve these. Used for a personal computer, etc., for instance, is a desktop metaphor which enables the computer to be seen just as a desk surface by displaying in what state the desk surface is on the display screen. Only recently, Applicant has come up with a television metaphor designed to display a television set metaphor on the display screen (cf. Japanese Patent Application No. Hei. 1-222497 now laid-open for public inspection under No. Hei. 3-84622).

Thus, a variety of metaphors have been known for presenting users with information. Usually, information processors include a plurality of metaphors, so that users can select pertinent one by switching them depending upon their tasks.

In conventional information processors, however, one metaphor is pre-matched with one function in one-for-one relation. For instance, an icon 30 letting the user image paper, as shown in FIG. 1A, is pre-matched with a word processor, so that with that icon selected, a document metaphor environment such as one shown at 32 can be displayed on a display screen 31 as shown in FIG. 1B, enabling the user to create a document.

However, the following problems arise when there are one-for-one fixed matches between metaphors and functions.

First, if there are one-for-one fixed matches between metaphors and functions, users face a very awkward problem, because they must discriminatively memorize which metaphor corresponds to which function. This basic problem becomes even so true with in mind the expectation that there will be a steady increase in the number of functions incorporated in information processors which, even now, include too many functions.

Second, the individual metaphors and functions have been managed under particular names, and a set of a certain metaphor and a function associated with it has been named according to a certain rule as well. Consequently, when there is need of changing the name of a particular metaphor/function set to a name departing from the above-mentioned rule for some unknown reasons, users unaccustomed to operating computers will get confused, because the metaphor can be seen but the function cannot run.

Third, matches between metaphors and functions are, in some cases, not necessarily familiar to users. For instance, the association of the metaphor shown in FIG. 1A with word processor functionality is not only easily understood by, but also familiar to, many users. However, many users will be puzzled, if it is associated with the metaphor shown in FIG. 1C. This is because there is mismatch between what the designer images when associating a certain metaphor with something and what a user does when seeing that metaphor. Still, it is impossible to eliminate this completely; not only does to determine what metaphor is associated with a certain function pose a design problem very difficult to solve, but the result is also not necessarily familiar to users. It has thus been pointed out that such mismatch makes it awkward for users to use computers and renders it for some users to understand computers.

Fourth, the amount, etc. of information handled by a certain function change momentarily with a user's operations; that is, a certain single metaphor alone fails to pertinently express the function with the quantity of information changing dynamically. Such a problem is not limited to the amount of information alone. Often used as the metaphor for a function which generates sounds, for instance, is a well-known musical instrument like a flute or trombone. Even when the metaphor of a trombone giving out a low-pitched sound is associated with some function, mismatch will occur between them as soon as that function is modified on a user's demand to give out a high-pitched sound such as that inherent in a flute.

Thus or generally, the problem with a metaphor and a function associated with it is that mismatch occurs between them unless they are pertinently associated with each other, because they have their own relevant ranges, much as musical instruments would have their inherent ranges. Such mismatch makes it awkward for users to use and understand information processors.

SUMMARY OF THE INVENTION

An object of this invention is to enable a metaphor/function combination familiar to users to be selected automatically. Another object of this invention is to provide a metaphor selecting/switching system in information processors, which enables one metaphor to switch automatically to another, whenever there is mismatch between it and a particular function associated with it.

According to this invention, the objects mentioned above are achieved by the provision of a metaphor selecting/switching system in an information processor which incorporates metaphor and function groups independently, selects a matched metaphor/function combination based on similarities between metaphors and functions and lets input and output of information be performed via an input/output means, characterized by comprising:

attribute lists having information on attributes and similarities regarding each metaphor and each function, a similarity calculator means for calculating similarities from the information on the similarities regarding each metaphor and each function, and a control means for controlling the switching of one metaphor to another and the matching of a particular metaphor with a particular function, said switching of one metaphor to another being performed by calculating said similarities whenever operation is performed via said input/output means.

Preferably, the attribute lists are characterized by having information which is set and updated by a particular operation done via said input/output means.

Preferably, the control means includes a mismatch discriminator means for discriminating a selected metaphor/function combination as mismatch based on the calculated similarity, and switches one metaphor to another on condition that mismatch has been discriminated. Preferably, the mismatch discriminator means discriminates the selected metaphor/function combination as mismatch, when the similarity of said combination is relatively smaller than those of other combinations, and gives mismatch warning via said input/output means when mismatch is discriminated and then switches the selected metaphor to one with a larger similarity.

In accordance with the present invention constructed above, as a certain metaphor or function is first indicated, the similarity calculator means calculates similarities between the metaphor or function and the functions or metaphors associated therewith with reference to the attribute list of metaphors and functions, enabling the control means to automatically select the function or metaphor having the highest similarity as a well-matched metaphor/function combination. This makes it unnecessary for the user to memorize which metaphor corresponds to which function, and so releases the user from troublesome work. In addition, the user can be presented with information with the metaphor most familiar to her or him, because the matching of metaphors with functions is achieved in terms of similarities therebetween. Even with an information processor having additional functions, the work load on the user can be reduced, because it can be used with metaphors familiar with her or him.

Furthermore, even when the user's operation brings on a change in the situation, it is always possible to provide the user with information with a metaphor pertinent to her or him. This is because as the similarity between the metaphor and function used decreases in magnitude, mismatch is so discriminated that the metaphor can switch to another metaphor with a similarity larger than that.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 illustrates the construction of one embodiment of the metaphor/function combination selecting/-switching system for information processors according to this invention, FIG. 3(A) and 3(B) represent lists of metaphor and function attributes, respectively, FIG. 4(A) and 4(B) represent how the lists of metaphor and function attributes are practically set, FIG. 5(A) and 5(B) represent calculated similarities, FIG. 7(A) and 7(B) illustrate lists of metaphor and function attributes, respectively, FIG. 9(A) and 9(B) illustrate a change in the similarities.

DESCRIPTION OF PREFERRED EMBODIMENTS

Figure 1A:
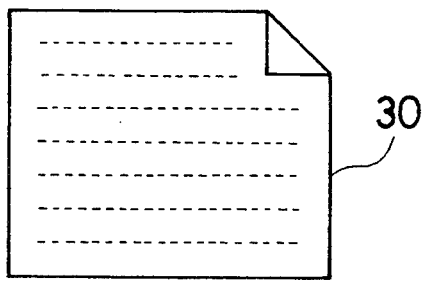
FIG. 1(A), 1(B), and 1(C) illustrate examples of the prior art and problems involved with it.
Figure 1C:
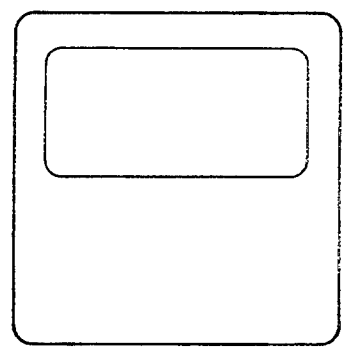
Figure 1B:
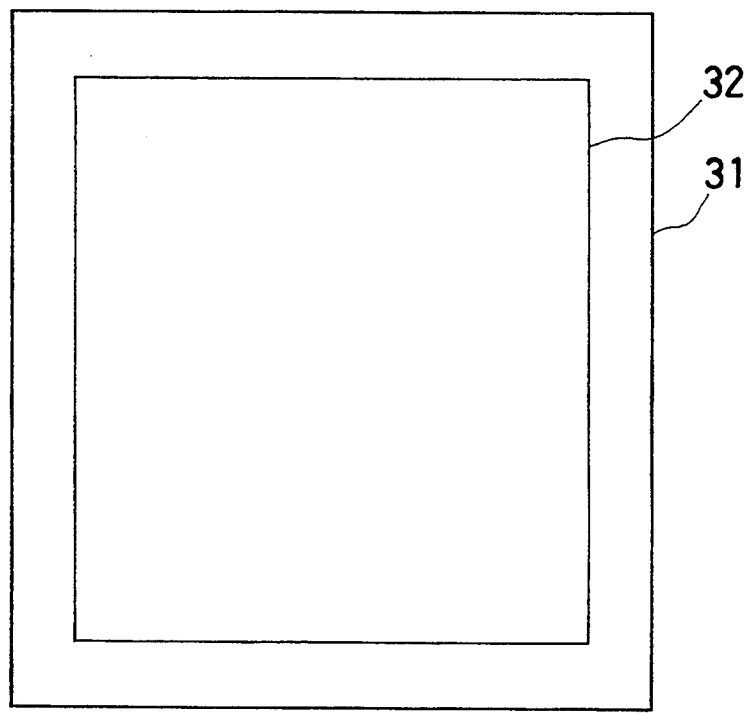

Referring now to FIG. 2, an input/output device 1 plays a user/computer interface role, and is made up of input hardware such as a keyboard and a pointing device and output hardware such as a CRT display and a printer.

Referring to a general name given to a plurality of functions, a function group 2 is a set of a variety of functions such as text database registration, text database retrieval, motion picture database registration, motion picture database retrieval, word processor, graphics editor and communication functions.

Referring to a general name given to a plurality of metaphors, a metaphor group 3 is a set of a variety of metaphors such as VTRs, telephones, newspapers, television sets, radio sets, news programs, dictionaries and directories. The metaphor group 3 is independent from the functional group 2, and vice versa.

A list 4 of function attributes is a table in which a set of attribute values are written per function, as shown in FIG. 3B. A specific example of this list 4 is shown in FIG. 4B; sets of values of two attributes, i.e., the type of information processing and the kind of information are set down regarding four functions, i.e., text database registration, text database retrieval, motion picture database registration and motion picture database retrieval.

For instance, the function of registering text database can perform neither creation and retrieval of information nor communication of information in view of the type of information processing; that is, it can be used only to store information. In view of the kind of information, visual information may be handled, as is the case with auditory information. Based on the estimation of each attribute, the text database registration function may be characterized such that in the attribute of the type of information processing as shown in FIG. 4B, the probabilities of creation, retrieval and communication are all 0%, while the probability of storage is 100%, and in the attribute of the kind of information, both visual and auditory probabilities are 50%. This too holds for other functions. As will be understood from the ensuing description, some attribute values are fixed and some variable depending upon a user's operations and selection, like the number of items of information.

A list 5 of metaphor attributes is a table in which a set of values of each attribute are written per metaphor, as shown in FIG. 3A. A specific example of this list 5 is illustrated in FIG. 4A; sets of values of two attributes, i.e., the type of information processing and the kind of information are set down regarding five metaphors, i.e., a VTR, a telephone, a newspaper, a television set and a radio set.

In general, a newspaper has no property of creating information directly. Nor has it the property of transmitting information. However, it has the property of allowing information to be retrieved by browsing news items and, in some cases, enables information to be stored by adding something to it. The information handled by a newspaper is visual rather than auditory in itself. From these, the newspaper is characterized such that in the attribute of the type of information processing, both the probabilities of creating and communicating information are 0%, while the proportion of information storage and retrieval are 2:8, say, 20% and 80%, as shown in FIG. 4A. Similarly, in the attribute of the kind of information, the salient visual and auditory probabilities are characterized as 100% and 0%, respectively. This too is true of other metaphors.

Here, note that the number $N_2$ of metaphors may be identical with or different form the number $N_1$ of functions, but the numbers M of the attributes set for both should be identical with each other, as will be appreciated from the ensuing description.

The attribute values (probabilities) written in the lists of function and metaphor attributes shown in FIGS. 4A and 4B, respectively, amount to 100% in terms of each attribute; in other words, they are data that is arbitrarily correctable by the user. For instance, a user, who assays the ratio of information storage and retrieval as 3:7, can change the attribute values of information storage and retrieval to 30% and 70%, respectively. This enables an individual user to achieve a function/metaphor combination well fit for her or him.

A similarity calculator means 6 is used to calculate similarities between metaphors and functions, thereby extracting a metaphor/function combination with a high similarity for listing, or selecting a metaphor/function combination with the highest similarity. For instance, now let $A(x,m,i)$ denote the attribute value of an i-th item of an attribute m of a metaphor x and $F(y,m,i)$ the attribute value of an i-th item of an attribute m of a function y. Then, the similarity between the metaphor x and the function y is found by the following formula (1):

$$\sum_m \left( \sum_i \min(A(x,m,i), F(y,m,i)) \right). \quad (1)$$

Note, however, that $$\sum_i A(x,m,i) = 1, \quad (2)$$

and $$\sum_i F(y,m,i) = 1. \quad (3)$$

Provided to control the information processor as a whole, a control means 7 is operable to set the necessary attribute values on the basis of a user's operation and selection to trigger the similarity calculator 6 and thereby select the best function/metaphor combination for controlling the input/output means. This control means 7 includes a mismatch discriminator means 8 as well. For each a user's operation, the attribute values are reset to trigger the mismatch discriminator 8 to determine whether or not there is mismatch, thereby selecting and switching the metaphors according to the user's operation. The mismatch discriminator means 8 is operable to trigger the similarity calculator 6 whenever the user launches an application, thereby determining whether or not there is mismatch from the similarities found.

In what follows, how the similarities are calculated will be explained. Now assume that the function y and metaphor x denote motion picture database retrieval and a television set, respectively, and they have the attribute values, shown in FIGS. 4A and 4B, regarding the two attributes, i.e., the type of information processing and the kind of information. Note, however, that m=1 and m=2 mean the type of information processing and the kind of information, respectively. Also note that when m=1, i=1,2,3 and 4 mean creation, storage, retrieval and communication, respectively, and when m=2, i=1 and 2 visual and auditory information, respectively. From calculation by Formula (1), the similarity between, e.g., a TV set and the motion picture database retrieval function is found to be 1.50, because the smaller values of the respective attribute values are added; that is, 0.50 for retrieval plus 0.50 for visual information plus 0.50 for auditory information (provided that others are assumed to be 0.00). Likewise, the similarity between a newspaper and the motion picture database retrieval function is found to be 1.30 by adding 0.80 for retrieval and 0.50 for visual information. The thus found similarities between each metaphor and the motion picture database retrieval or registration function are shown in FIG. 5A or 5B.

In the ensuing description, how the system shown in FIG. 2 operates will be explained. The explanation begins with the case where the user selects the metaphor or function used by the input/output device 1.

Now assume that a certain function Y is selected. Then, the control means 7 triggers the similarity calculator 6. This in turn causes the similarity calculator 6 to accept from the list 4 of function attributes a set of attribute values of each attribute regarding the function Y and from the list 5 of metaphor attributes sets of attribute values of each attribute regarding all metaphors so as to calculate the similarities between the function Y and all metaphors.

Figure 6:
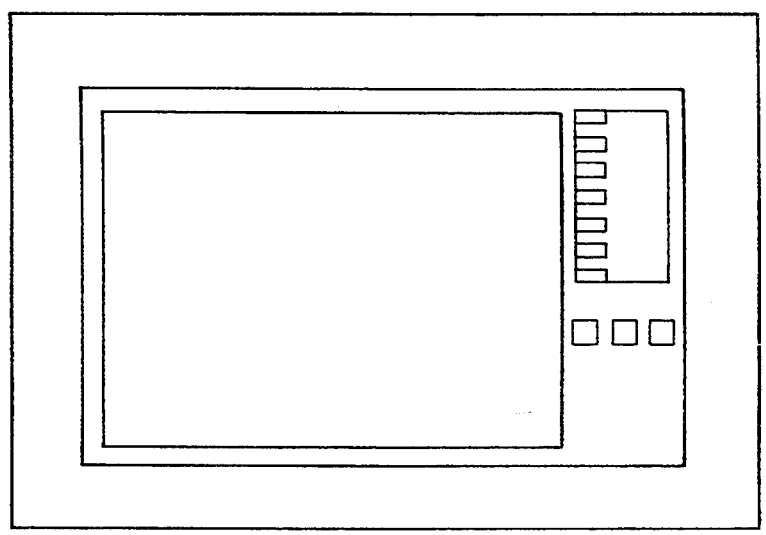
FIG. 6 shows a television metaphor.

More specifically, now assume that text database retrieval is first selected as function. Then, the similarity calculator 6 accepts from the list 4 a set of attribute values regarding text data base retrieval shown in FIG. 4B and from the list 5 sets of attribute values regarding all metaphors shown in FIG. 4A. By calculation from Formula (1), the similarities between the text database retrieval function and each of the VTR, telephone, newspaper, television set and radio set metaphors are found. The results of these calculations are set out in FIG. 5A. Thus, the similarity calculator 6 determines the retrieval function/TV combination having the maximum similarity as the best, and then notifies it to the control means 7, which in turn selects the text database retrieval function from the function group 2 and the television metaphor from the metaphor group 3 for matching. Thus, the metaphor of a television set, shown in FIG. 6, is displayed on the display screen of the input/output device 1, and the text database retrieval function is put in operation.

Note that when the text database registration function is selected, the similarities set out in FIG. 5B are obtained between it and each metaphor. In this case, the similarity calculator 6 will select the VTR metaphor as the desired metaphor.

While the foregoing have been described as the function being first selected, this is also true of when the metaphor is first selected; that is, a function with the maximum similarity is selected.

When the function which the user wants to use first is selected, the similarity calculator 6 calculates the similarities between the function indicated by triggering the control means 7 and all metaphors. Then, it determines the metaphor/function combination with the maximum similarity as the best and notifies it to the control means 7. In the process during which the function is running in that metaphor environment, however, there is often a situation change, for which the selected function/metaphor combination does not necessarily lend itself best fit. According to this invention, if such a situation change occurs, then the attribute values are updated to re-calculate the similarities, so that a decrease in the similarity regarding that metaphor and an increase in the similarity regarding other metaphors can be discriminated as mismatch. Then, the metaphor with the highest similarity or metaphors having certain or higher similarities are listed up and notified to the control means 7, whereby mismatch warning is given or the metaphors can be automatically switched. This example will be explained, just below, with reference to using as the attribute the number of items of information or an information sort key.

When the number of items of information or the information sort key is used as the attribute, the attribute values regarding said attribute of the function have the property of varying in dependence on operation (situation change). That is, when the number of items of information is divided into the ranges of 2-9, 10-199 and 200 or more, the television program metaphor of the metaphors is characterized by an attribute value of high probability if the number of items of information is smaller. If that number is larger, then the dictionary metaphor is characterized by an attribute value of high probability and if it lies halfways, then the address directory is characterized by an attribute value of high probability. Consequently, in the news program metaphor shown in FIG. 7A, a high-probability attribute value as high as 90% is assigned to the range of 2-9; in the dictionary metaphor, 60% to the range of 200 or more; and in the address directory metaphor, 80% to the range of 10-199. When the information sort key is divided into category, keyword, person and date, on the other hand, in the news program metaphor, a high-probability attribute value as high as 100% is assigned to the category; in the dictionary metaphor, 70% to the keyword; and in the address directory metaphor, 80% to the person.

On the other hand, the functions of text data base registration and retrieval vary momentarily, for instance, the number of items of information increases from 4 to 21 and vice versa, or the information sort key changes from the keyword to the person. Thus, the attributes of the number of items of information and the information sort key, because of being unable to be fixed, are taken as values established at the time of execution, as shown in FIG. 7B. When there is a situation change letting the attribute values of the number of items of information and the information sort key vary, the metaphor, which has the highest similarity with respect to a certain function and so is regarded as the best, decreases relatively in terms of similarity and, instead, other metaphor increases in terms of similarity. Some attribute values established at the time of execution change in the contents whenever the user performs operation. When these attribute values are updated by the user's operation, the similarity is re-calculated on the basis of the newly established attribute values, whereby discrimination of whether or not there is mismatch or a switch of one metaphor to another can be effected.

Figure 8:
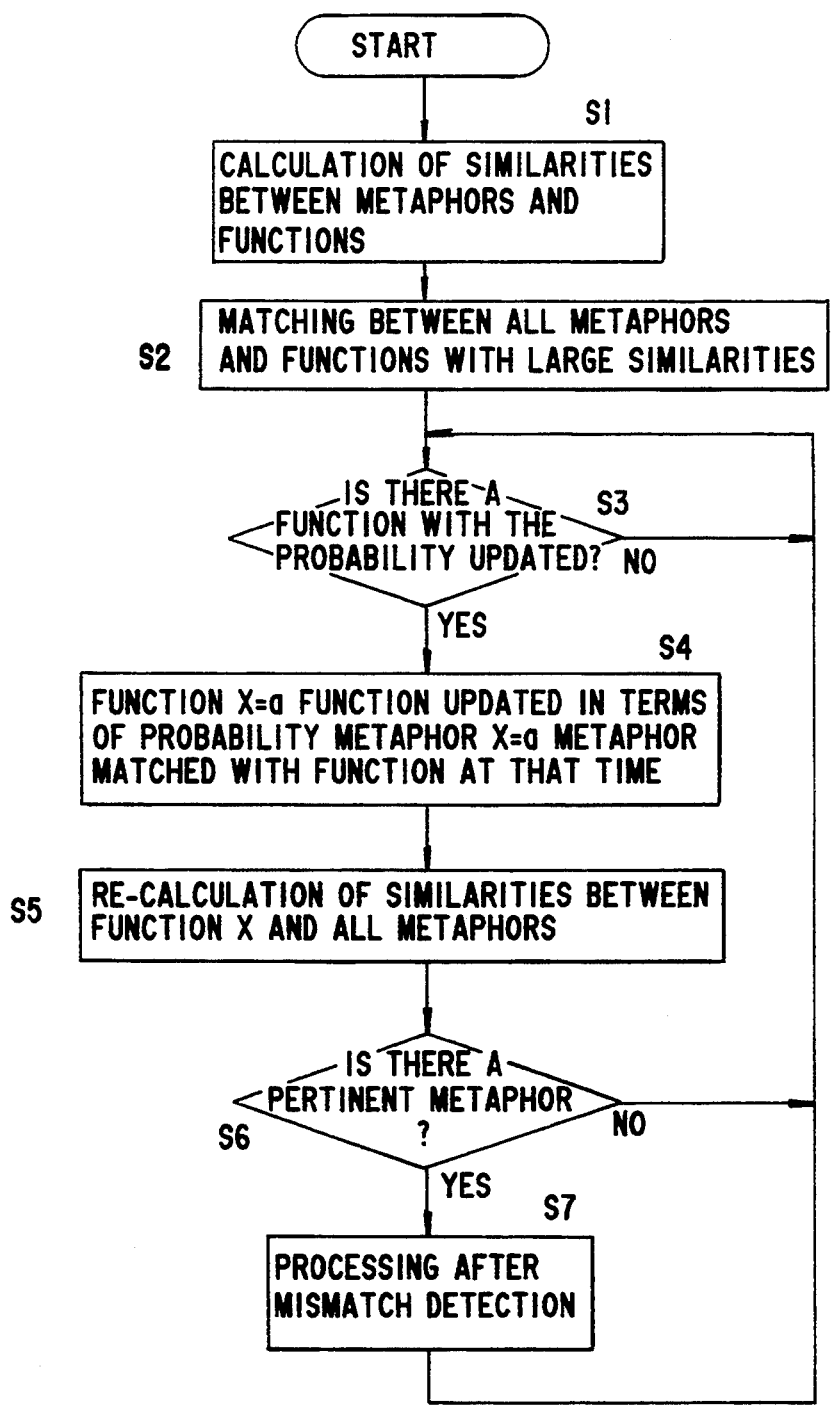
FIG. 8 represents how mismatch is discriminated.

In what follows, discrimination of whether or not there is mismatch and how the similarity changes will be explained with reference to FIG. 8.

First, the similarity calculator 6 is used to accept a set of attribute values of each attribute from the lists 4 and 5 and then calculate the similarities between the metaphors and the functions (Step S1).

Subsequently, all the metaphors are associated with functions having large similarities (Step S2).

Then, investigation is made of whether or not there is a function whose probability is updated (Step S3). If there is a function with the probability updated (YES), a function X is taken as the function with the probability updated, and a metaphor X is regarded as the metaphor associated with the function X at that time (Step S4). And the similarities between the function X and all the metaphors are re-calculated (Step S5).

After that, investigation is made of whether or not there is a metaphor whose similarity is larger than that between the function X and the metaphor X (Step S6). If not found (NO), the system goes back to Step S3. If found (YES), not only is a warning message produced but other processings for detecting mismatch are also done (Step ST). Then, the system goes back to Step S3.

Figure 10A:
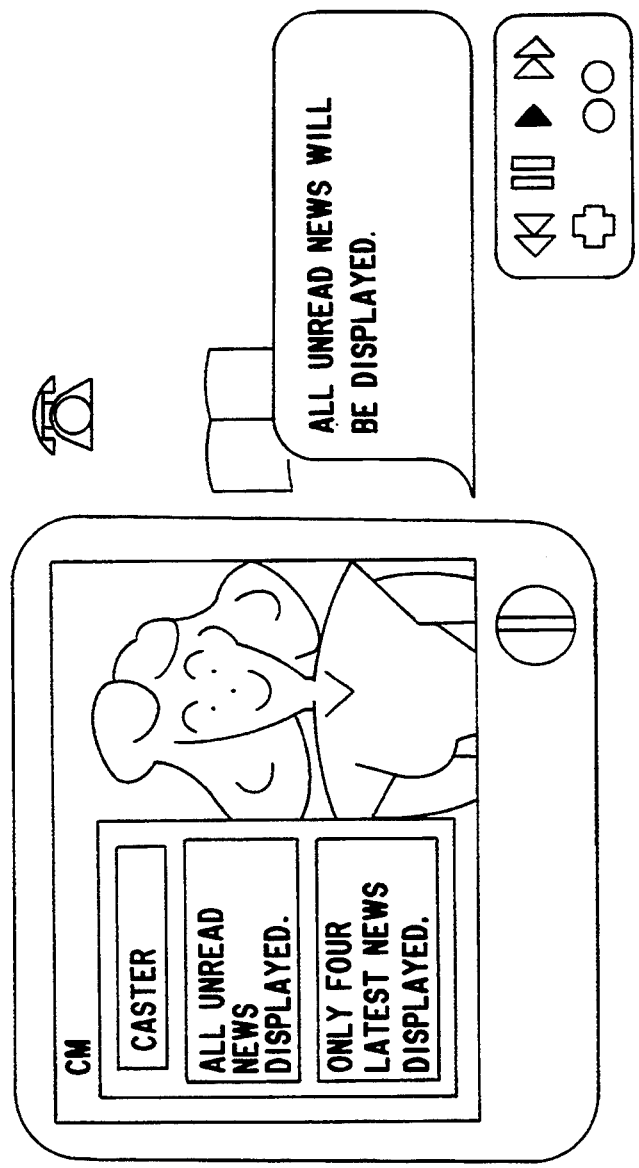
FIG. 10(A), 10(B), 10(C), and 10(D) show examples of warning and other messages being displayed on the screens.
Figure 10B:
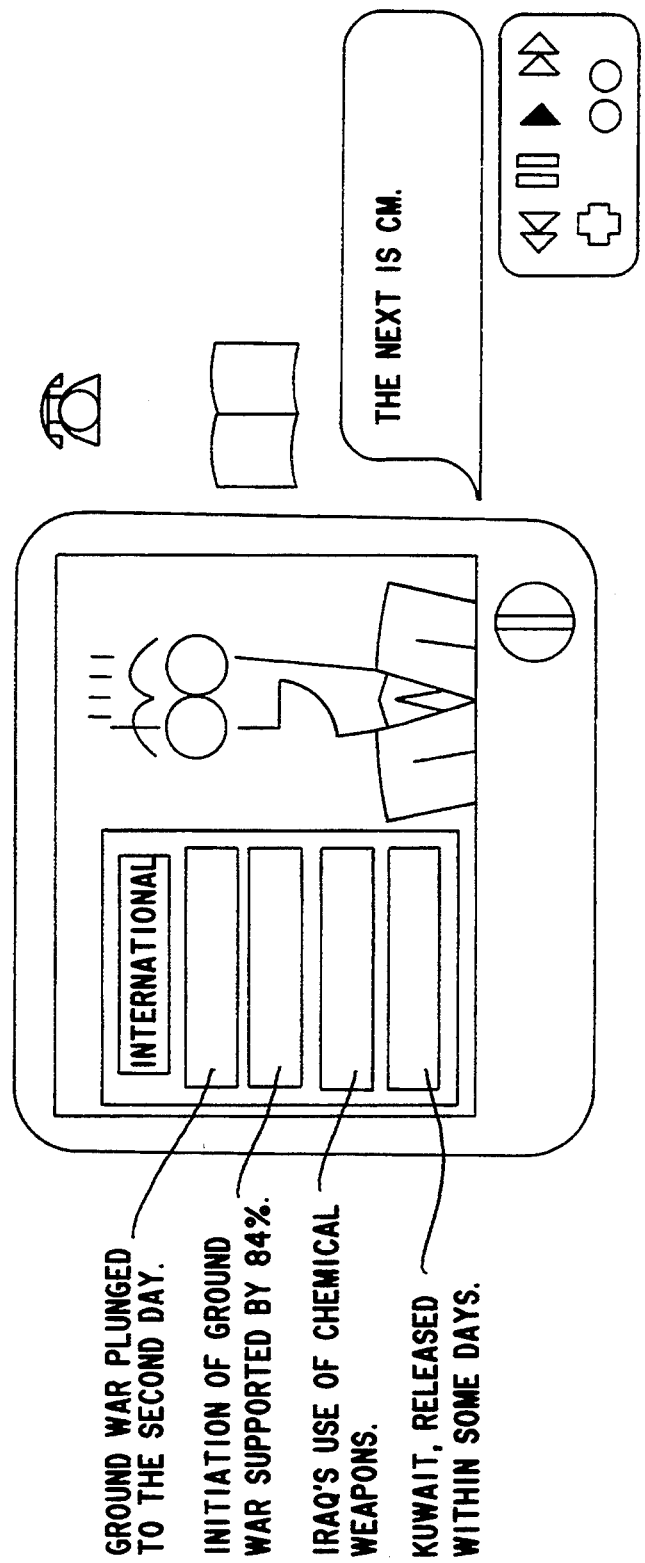

Here, mismatch will be explained with reference to a more specific example. For instance, now assume that four items are included in the initial value of the attribute "number of items of information" of the text database retrieval function. Then, the probability of the attribute value name "2-9" is 100% and the similarity calculated reaches a maximum of 2.13 in the news program, as shown in FIG. 9A. In this case, therefore, information is presented in a news program format, as shown in FIGS. 10A and 10B.

However, if as many as 21 items of information are retrieved because of a change in the retrieval conditions, then the probabilities of the attribute value names "2-9" and "10-199" are updated to 0% and 100%, respectively. Accordingly, when the similarities are re-calculated at those probabilities, there is a similarity change, as shown in FIG. 9B; that is, the similarity with respect to the news program is 1.33, the figure being smaller than 1.73 for the similarity with respect to the dictionary and much smaller than 1.60 for the address directory. Thus, the state where the similarity the metaphor/function combination has at that point remains not maximized is detected as mismatch.

Figure 10C:
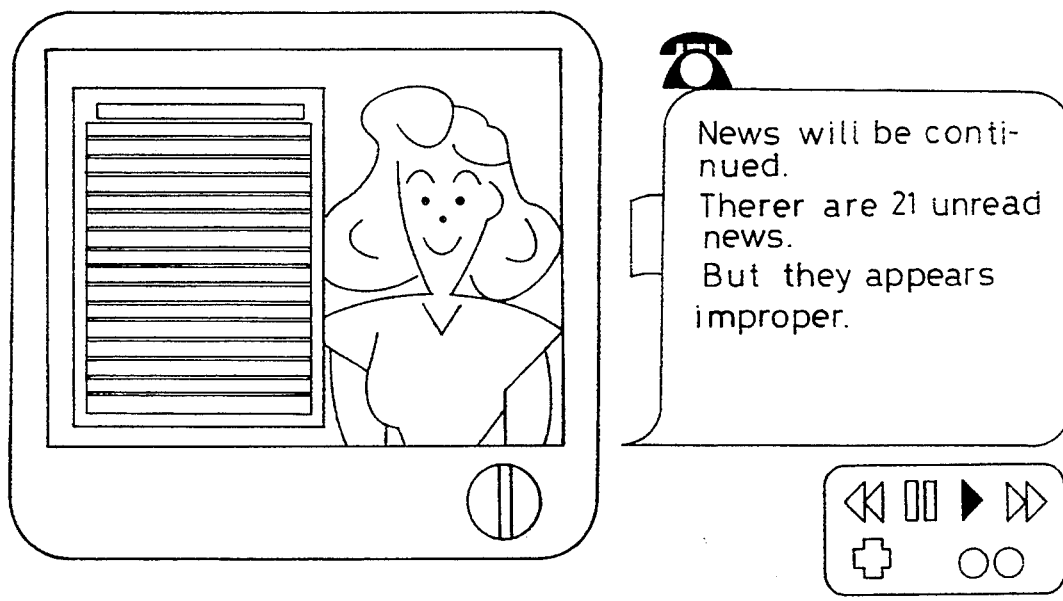

Following the detection of mismatch, the metaphor switches to another metaphor after mismatch warning is given to the user by the input/output device. In some cases, unilateral metaphor switching may give the user a feeling of incompatibility. Such an emotional problem may be solved by presenting an example of mismatch rather directly to the user, as shown in FIG. 10C, and leaving whether or not metaphor switching is to be done to the user.

Figure 10D:
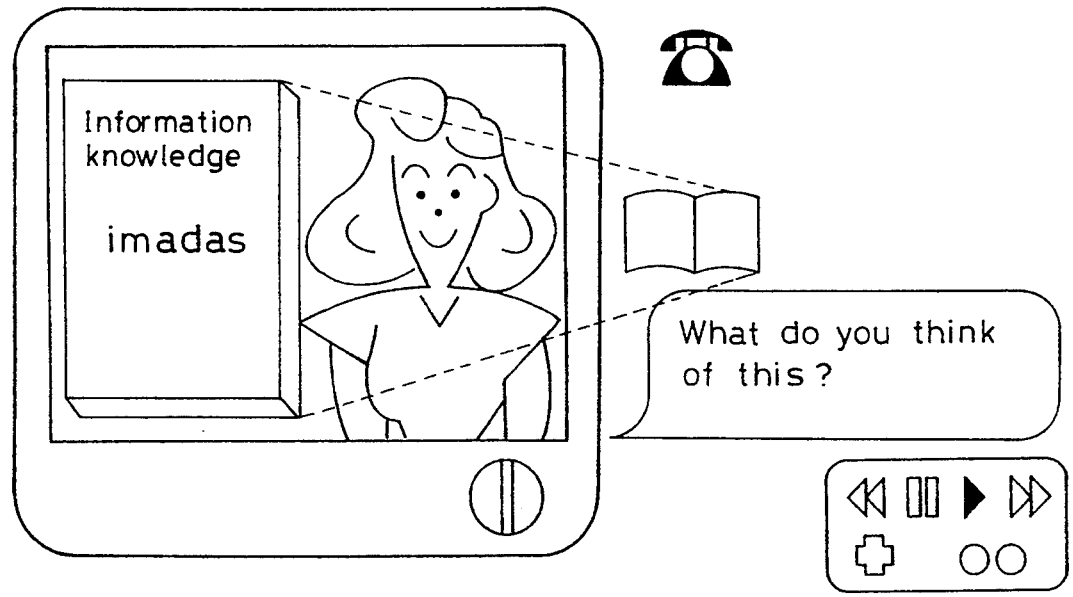

In the alternative, the metaphor with the highest similarity may be presented to the user, as shown in FIG. 10D. Further, if there are a plurality of metaphors whose similarities are close to each other, then they may be listed up, letting the user chose them. A feeling of incompatibility the user has may be alleviated by placing emphasis on the change together with a multimodal sound comment, e.g., "IMPROPER. WHAT DO YOU THINK OF THIS?"

It is understood that the present invention is not limited to the above-mentioned embodiment wherein the similarities are calculated to select the metaphor/function combination with the largest similarity; various modifications may be made thereto. For instance, switching one selected metaphor to another may be deferred until certain conditions are reached, even when the similarity of the selected metaphor/function combination remains relatively smaller than those of other combinations.

In other words, the switching of metaphors, if done only through a relative comparison of their similarities, will occur too frequently to confuse the user. In order to avoid this, the present system is designed such that even when the similarity of the selected metaphor/function remains relatively smaller than those of other combinations, switching that metaphor to another may be deferred until the former similarity becomes below a certain value or a difference between the similarities exceeds a certain value. And when there are a plurality of certain values, such switching may be performed on the basis of the user's instructions as to which metaphor is to be selected from the list presented to the user, as mentioned above.

In the foregoing embodiment, the similarities are calculated by making a total of the smaller attribute values. However, they may be found by weighting some attributes as well. In other words, while a weight function $W(m)$ (provided that $$\sum_i W(m) = 1)$$

are set on the attributes 1, 2, ... M, similarities are calculated by the following formula:

$$\sum_m \left\{ W(m) \times \sum_i \min(A(x,m,i), F(y,m,i)) \right\}. \quad (4)$$

For instance, when there are two attributes, i.e., the type of information processing and the kind of information, some users will take both as equivalent and some users will take one as more important than the other. Such users' biases toward the attributes can be incorporated into the similarities by using the above-mentioned weight function $W(m)$ as a parameter.

In accordance with the present invention constructed above, the similarities between metaphors and functions are calculated to automatically select a function or metaphor having the highest similarity and thereby achieve a pertinent match therebetween. This makes it unnecessary for the user to memorize which metaphor corresponds to which function, and so releases the user from troublesome work.

In addition, when the similarity of the selected metaphor/function combination is made relatively smaller than those of other combinations by the user's some operation, the selected metaphor switches to a metaphor having a larger similarity; even when there is a change in the quantity of information handled by the function, it is always possible to provide the user with a pertinent metaphor.

Since metaphors are matched with functions in terms of similarities in this manner, the user can be presented with information with a metaphor most familiar to her or him. Even when an information processor is provided with additional functions, it can be used with a metaphor familiar to the user, making it possible to relieve the work load on the user.

What I claim is:

1. A metaphor selecting/switching system in an information processor which incorporates metaphor and function groups independently, selects a matched metaphor/function combination based on similarities between metaphors and functions and lets input and output of information be performed via an input/output means, said system comprising:

attribute lists having information on attributes and similarities regarding each metaphor and each function;

a similarity calculator means for calculating similarities from the information on the similarities regarding each metaphor and each function; and a control means for controlling switching of one metaphor to another and matching of a particular metaphor with a particular function, said switching of one metaphor to another being performed by calculating said similarities whenever operation is performed via said input/output means.

2. A metaphor selecting/switching system in an information processor as claimed in claim 1, characterized in that said control means includes a mismatch discriminator means for discriminating a selected metaphor/function combination as mismatch based on the calculated similarity, and switches one metaphor to another on condition that mismatch has been discriminated.

3. A metaphor selecting/switching system in an information processor as claimed in claim 2, characterized in that said mismatch discriminator means discriminates the selected metaphor/function combination as mismatch, when the similarity of said combination is relatively smaller than those of other combinations.

4. A metaphor selecting/switching system in an information processor as claimed in claim 2, characterized in that mismatch warning is given via said input/output means when mismatch is discriminated in switching one metaphor to another, and the selected metaphor is then switched to a metaphor with a larger similarity.

5. A metaphor selecting/switching system in an information processor as claimed in claim 1, characterized in that said attribute list has information which is set and updated by a particular operation performed via said input/output means.

* * * * *